(12) United States Patent
Habberfield

(10) Patent No.: US 9,894,636 B1
(45) Date of Patent: Feb. 13, 2018

(54) METHOD FOR SHARING INFORMATION ABOUT OBSTRUCTIONS IN A PATHWAY

(71) Applicant: Kevin M Habberfield, Hamburg, NY (US)

(72) Inventor: Kevin M Habberfield, Hamburg, NY (US)

( * ) Notice: Subject to any disclaimer, the term of this patent is extended or adjusted under 35 U.S.C. 154(b) by 0 days.

(21) Appl. No.: 15/273,180

(22) Filed: Sep. 22, 2016

(51) Int. Cl.
| | |
|---|---|
| H04M 3/42 | (2006.01) |
| H04W 64/00 | (2009.01) |
| H04L 29/08 | (2006.01) |
| H04W 4/04 | (2009.01) |
| H04W 4/02 | (2009.01) |

(52) U.S. Cl.
CPC .......... *H04W 64/006* (2013.01); *H04L 67/26* (2013.01); *H04W 4/025* (2013.01); *H04W 4/046* (2013.01)

(58) Field of Classification Search
CPC ..................................... H04W 8/22
USPC ............. 455/414.1; 340/435, 439, 472, 479; 701/532
See application file for complete search history.

(56) References Cited

U.S. PATENT DOCUMENTS

| | | | |
|---|---|---|---|
| 5,280,632 A | | 1/1994 | Jung-Gon |
| 6,188,957 B1 | | 2/2001 | Bechtolsheim |
| 6,411,896 B1 | | 6/2002 | Shuman |
| 6,526,349 B2 | | 2/2003 | Bullock |
| 8,805,707 B2 * | 8/2014 | Schumann, Jr. . | G08G 1/096775 705/35 |
| 9,558,520 B2 * | 1/2017 | Peak ...................... | G06Q 40/08 |
| 2003/0154019 A1 * | 8/2003 | Adachi .................. | G01C 21/34 701/532 |
| 2005/0033516 A1 * | 2/2005 | Kawasaki ............. | B60R 21/013 701/301 |
| 2006/0220826 A1 * | 10/2006 | Rast ........................ | B60Q 1/44 340/479 |
| 2007/0152804 A1 * | 7/2007 | Breed .................. | B60N 2/2863 340/435 |
| 2008/0154495 A1 * | 6/2008 | Breed .................... | G01C 21/12 701/472 |
| 2009/0030605 A1 * | 1/2009 | Breed .................. | B60N 2/2863 701/532 |
| 2009/0140887 A1 * | 6/2009 | Breed .................. | G01C 21/165 340/990 |
| 2011/0161116 A1 * | 6/2011 | Peak ...................... | G06Q 40/08 705/4 |

(Continued)

*Primary Examiner* — William D Cumming
(74) *Attorney, Agent, or Firm* — Vincent G. LoTempio; Kloss, Stenger & LoTempio; David T. Stephenson

(57) ABSTRACT

A system and method for sharing information about obstructions in a pathway informs a user and members of a network about an obstruction in a pathway. A user or members of network observe and record the obstruction, and share the information in a database. The information can be in the form of global positioning system coordinates, comments, images, audible alerts, and anecdotes. A geographical database and a global positioning system operatively connect to a portable communication device of user to alert and notify about the obstruction and also, provide additional information the pathway. The user and members of the network may verify and add information about the obstruction, and then share this updated information with other members of the network. Further, a proprietor of the pathway is notified about the obstruction, so as to remove or repair the obstruction, or process cost estimates and for litigation and insurance purposes.

16 Claims, 2 Drawing Sheets

(56) References Cited

U.S. PATENT DOCUMENTS

| | | | | |
|---|---|---|---|---|
| 2011/0213628 A1* | 9/2011 | Peak | ................... | G06Q 40/08 |
| | | | | 705/4 |
| 2012/0123806 A1* | 5/2012 | Schumann, Jr. | ....... | G06Q 40/08 |
| | | | | 705/4 |
| 2013/0150004 A1* | 6/2013 | Rosen | .................... | H04W 8/22 |
| | | | | 455/414.1 |
| 2014/0350970 A1* | 11/2014 | Schumann, Jr. | ....... | G06Q 40/08 |
| | | | | 705/4 |
| 2015/0054639 A1* | 2/2015 | Rosen | ............... | G06K 9/00785 |
| | | | | 340/439 |

* cited by examiner

METHOD FOR SHARING INFORMATION ABOUT OBSTRUCTIONS IN A PATHWAY

FIELD OF THE INVENTION

The present invention relates generally to a system and method for sharing information about obstructions in a pathway. More so, the present invention relates to a system and method that informs a user, visitors to a website and members of a network to an obstruction in a pathway used by the user and the members of the network; whereby the obstruction is recorded by the users and members of the network in real time, and compiled in a database in the form of maps, global positioning system coordinates, audible alerts, images, and anecdotes; whereby the user and members can share the global positioning system coordinates, audible alerts, images, and anecdotes on the network or additional social networks; whereby a proprietor of the pathway is notified about the obstruction in the pathway, including the type, location, and nature of the obstruction; and whereby a receipt is provided to the proprietor to prove that the proprietor has been notified to the obstruction. The notice is stored and can be retrieved by interested parties at a later time including insurance companies, government agencies and litigants. Additionally, the notice can be certified as true and accurate.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, navigation systems are available that provide users with various navigation-related functions. For example, some navigation systems are able to determine an optimum route to travel between locations in a geographic region. Using input from the end user, and optionally from equipment that can determine one's physical location, such as a GPS system, a navigation system can examine various routes between two locations to determine an optimum route to travel from a starting location to a destination location in a geographic region. The navigation system may then provide the end user with information about the optimum route in the form of guidance that identifies the driving maneuvers required to be taken by the end user to travel from the starting location to the destination location.

Often, navigation systems use geographic data. The geographic data may be in the form of one or more databases that include data that represent physical features in a geographic region. The geographic database may include data representing pathways in a geographic region and also may include information relating to the pathways in the geographic region, such as travel restrictions, speed limits, street or pathway names, address ranges, and so on.

It is recognized that many of the accidents that occur each year in paths of travel are directly caused by unexpected obstructions and hazards, such as fallen trees or branches, stones falling onto the pathway and cargo or debris, broken sidewalks, down power lines, car crashes, restricted areas, potholes, cracks, crevices, hazards, ice, snow, water, dirt, mud and many other hazardous conditions. At least some of these accidents could be avoided if the obstruction and hazards were reported and updated, and if the travelers were informed of the obstruction or hazard in real time.

In many instances, obstructions, such as potholes, slippery surfaces, and the like are encountered in surfaces, such as sidewalks, pathways, lots, trails, subways, grass, lands, property, roads, highways, driveways, parking lots and any surfaces which experience wear due to travel, temperature, weather, and the like. Currently, many devices provide route-planning guidance to route around traffic obstacles such as accidents, construction, and the like. However, a drawback of existing route planning systems is that hazards are not tracked and reported in real time so that a user may avoid such hazards. Also, the proprietor is never informed about the obstruction or road hazard.

Other proposals have involved road obstruction avoidance systems. The problem with these road safety systems is that they do not track and report the obstruction in real time so that a vehicle may avoid such road hazards. Also, the proprietor of the road is never informed about the obstruction or road hazard. Even though the above cited road safety systems meet some of the needs of the market, a system and method for sharing information about obstructions in a pathway that informs a user, website visitors and members of a network to an obstruction in a pathway in real time, and also notifies a proprietor about the obstruction is still desired.

SUMMARY

Illustrative embodiments of the disclosure are generally directed to a system and method for sharing information about obstructions in a pathway. The system and method serves to inform a user and members of a network about an obstruction in a pathway that is used by the user and the members of the network. In one embodiment, the system and method is operable as a downloadable software application that enables network members to indicate to other members about the location, type, and duration of the obstruction in real time. The software application then automatically alerts the user and members when approaching or proximal to the obstruction.

In some embodiments, the obstruction in the pathway is observed and recorded by the user or members of the network, and compiled in a database in the form of maps, global positioning system coordinates, audible alerts, images, comments, and anecdotes. The user and members may verify, share, and add to the information about the obstruction. When the user or members are proximal to the obstruction, an automated alert is received to indicate the presence of the obstruction. Once alerted, the user may search in the database or inquire from the members of the network about alternate pathways or additional information about the obstruction. Further, a proprietor of the pathway can be informed about the obstruction to encourage removal of the obstruction or for cost estimate or litigation purposes.

In one embodiment, the system and method enables a user or members of a network to observe an obstruction in a pathway and then share the information, i.e., images, location, type, duration of the obstruction with other members of the network, and a database that is dedicated to storing information about the obstruction and the pathway. A proprietor of the pathway may also be informed about the obstruction with proof thereof.

In one embodiment, the obstruction is recorded by users or members of the network who have witnessed or received credible information about the obstruction. The user or members may then verify and share the information to other members. This obstruction related information may be transmitted and stored in the database for access by all parties. The obstruction and pathway related information may include, without limitation, maps, global positioning system coordinates, audible alerts, images, comments, and anecdotes.

A global positioning system tracks a communication device of the user and members. The global positioning system is operatively connected to the database. Consequently, the user and members are alerted to the obstruction in the pathway and can affirm or deny that it is present at any time. This interactive functionality by the user and members of the network adds further obstruction related information to the database, and also serves to verify the veracity of claims of the obstruction. Once the user and members are alerted to the obstruction, the user and members can avoid the pathway, or the obstruction, or both, and continue safely around the obstruction or follow an alternate pathway.

Further, the user or members may notify a proprietor about the obstruction, including the images, location, type, duration, and nature of the obstruction in the pathway. The proprietor may include, without limitation, a landowner, a government entity, and other users in the network. The user and members of the network are made aware that the proprietor has been informed about the presence of the obstruction. In this manner, the proprietor is encouraged to remove or repair the obstruction from the pathway. Further, a receipt is provided to the user, members, and proprietor to validate that the proprietor has been notified about the obstruction. The receipt may be useful for litigation or labor cost estimates.

The system and method for sharing information about obstructions in a pathway comprises a downloadable software application that enables the user and network members to indicate to other members about the location, type, and duration of the obstruction in real time.

In one embodiment, a method for sharing information about obstructions in a pathway comprises an initial Step of observing, by a user or members of a network, an obstruction in a pathway.

A Step may further include recording, by the user or members of the network, information about the obstruction, the recorded information including the location, type images and duration of the obstruction;

A Step further comprises verification of the obstruction by the user and the members of the network.

Another Step comprises sharing the recorded information about the obstruction with a database, the user, and the members of the network.

A Step may include detecting the position of the user or members of the network, relative to the pathway.

A Step further comprises alerting the user or the members of the network when the user or the members of the network are proximal to the obstruction.

Another Step comprises sharing the recorded information about the obstruction with a proprietor of the pathway.

The method may include a further Step of generating a receipt indicating that the proprietor is informed about the obstruction.

In one embodiment, an alternative Step comprises paying a fee to access the network and the database as well as search same.

In one aspect, the pathway includes at least one member selected from the group consisting of: a sidewalk, pathway, lot, parking lot, trail, subway, grass, land, property, road, a path, a park pathway, a bike trail, a hiking trail, a route, a tributary, and a channel.

In another aspect, obstruction includes at least one member selected from the group consisting of: a physical blockage of the pathway, a hole in the pathway, uneven terrain on the pathway, a natural disaster proximal to the pathway, a wild animal proximal to the pathway, a prison escape proximal to the pathway, a traffic incident, smoke, toxic vapors, and any general menace, hazard, hazardous condition(s) or danger to travelers on a pathway.

In another aspect, the method further comprises a global positioning system.

In another aspect, the step of detecting the position of the user or members of the network, relative to the pathway, further includes detecting the position of the user or members of the network, further comprises detecting the position with the global positioning system.

In another aspect, the database is a geographical database configured to store information about the pathway and proximal region of the pathway.

In another aspect, the step of alerting the user or the members of the network when the user or the members of the network are proximal to the obstruction, further comprises alerting with an audible signal, vibration, message, a text, an email and a phone call.

In another aspect, the network includes at least one member selected from the group consisting of: a social network, a website, a network of commuters, a vacationer network, a traveler network, a law enforcement network, and a first response network.

In another aspect, the proprietor includes at least one member selected from the group consisting of: a land owner, a government entity, society, proprietor, tenant, condominium/home owners association and any member of the network.

In another aspect, the method is cloud based and accessible via the Internet; and In another aspect, the method is configured for use on all operating systems, including desktop, internet and mobile versions.

One objective of the present invention is to share information with a network of users and a database about a potentially dangerous obstruction in a pathway.

Another objective is to share the information on a social network, a chat, or a video.

Another objective is to enable verification and addition to the shared information about the obstruction.

Yet another objective is to detect the presence of the user or members of the network relative to the obstruction.

Yet another objective is to automatically alert the user or members of the network when approaching the obstruction on the pathway.

Yet another objective is to notify the proprietor of the pathway about the obstruction.

Yet another objective is to use a geographic database that includes data about the locations of pathways, the geographic database operable with a navigation system that provides warnings as the user approaches the obstruction in the pathway.

Yet another objective is to monetize the system and method by charging a fee to access the application, network or the database, perform searches, provide certified proof of notice, provide data to insurance companies and litigants Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
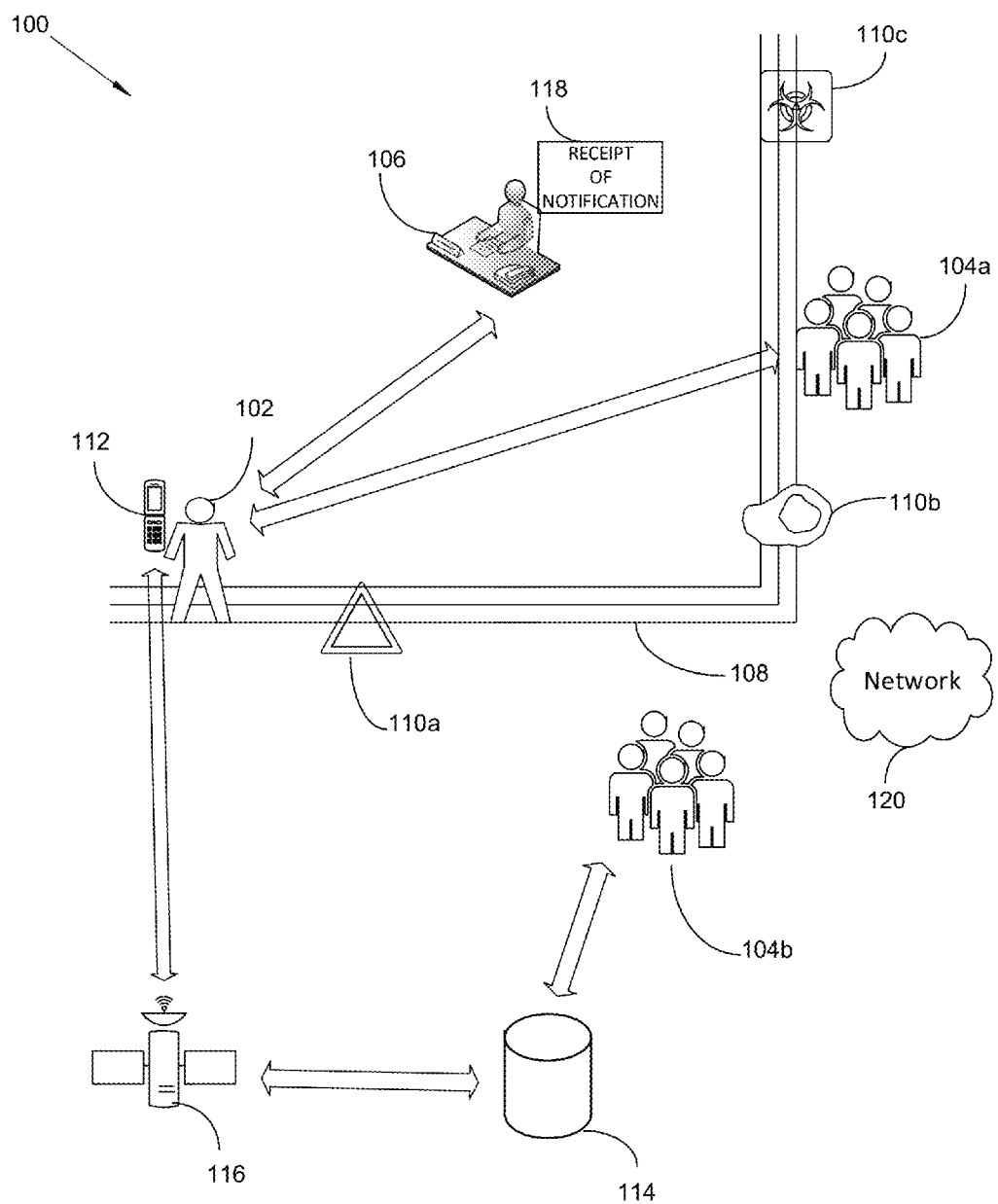
FIG. 1 illustrates a block diagram of an exemplary system for sharing information about obstructions in a pathway, in accordance with an embodiment of the present invention.
Figure 2:
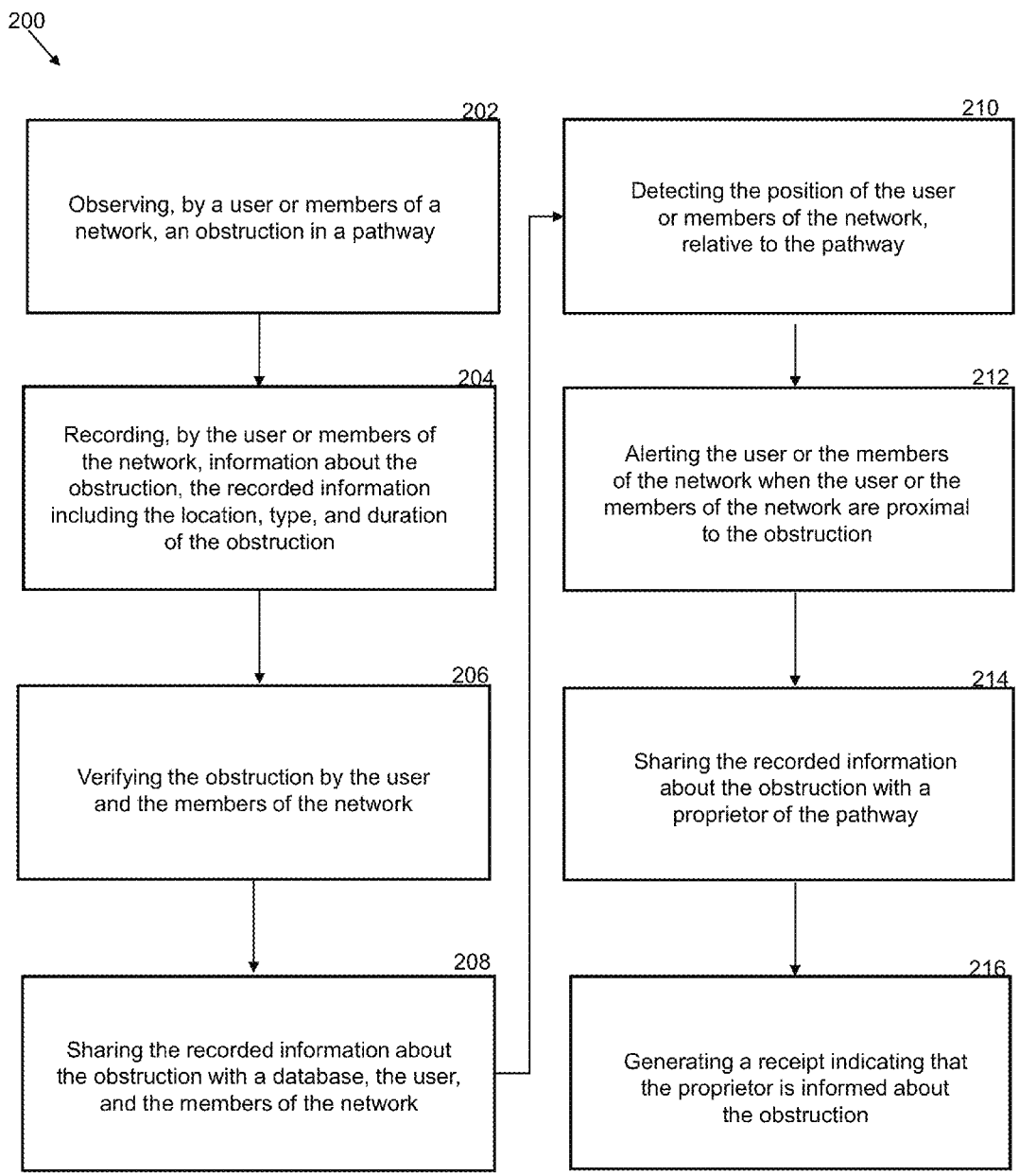
FIG. 2 illustrates a flowchart diagram of an exemplary method for sharing information about obstructions in a pathway, in accordance with an embodiment of the present invention.

A system 100 and method 200 for sharing information about obstructions in a pathway is referenced in FIGS. 1-2. As shown in FIG. 1, a system 100 and method 200 for sharing information about obstructions in a pathway is configured to inform a user 102 and members 104a, 104b of a network about an obstruction 110a-c in a pathway 108. In some embodiments, user 102 or members 104a, 104b of a network 120 may observe and record the obstruction 110a-c, and share the information with each other, and in a database 114. The information may include: a global positioning system coordinate, a comment, an image, an audible alert, and an anecdote.

In some embodiments, database 114 and a global positioning system 116 operatively connect to a portable communication device 112 of the user 102 and members 104a, 104b of the network 120. In this manner, an alert may be transmitted to user 102 or members 104a, 104b to alert and notify about the obstruction 110a-c and also, provide additional information pathway 108.

Further, user 102 and members 104a may verify and add information about the obstruction 110a-c, and then share this updated information with other members 104b of the network. In yet another embodiment, a proprietor 106 of pathway 108 is notified about the obstruction 110a-c and provided a receipt 118 to acknowledge that the information was received. In this manner, proprietor 106 may work to remove or repair obstruction 110a-c, or process cost estimates for removal of the obstruction, insurance estimates, insurance adjustments, provide certified notice to interested parties or address litigation.

In one possible embodiment, system 100 may be operable as a downloadable software application. The digitized, wireless configuration of the software application enables the user 102 and network members 104a to indicate to other members 104b and the proprietor 106 about the location, type, and duration of the obstruction 110a-c in real time. This instantaneous information about the obstruction 110a-c enables the software application to automatically alert the user 102 and members 104a, 104b when approaching, or proximal to the obstruction 110a-c.

In other embodiments, system 100 may download on a portable communication device 112, such as a smartphone, a vehicle positioning system, a tablet, or a laptop. It is significant to note that system 100 is most effective in a portable configuration, like a smartphone, because traversing a pathway 108 is a dynamic function and obstructions 110a-c are constantly appearing and being removed. Thus, a real time system for sharing information about obstructions is necessary for effective use thereof. In yet another embodiment, the system 100 may be cloud based and accessible via the Internet. In yet another embodiment, system 100 is configured for use on a desktop operating system and a mobile operating system.

Looking back at FIG. 1, obstruction 110a-c in pathway 108 is observed and recorded by user 102 or members 104a, 104b of the network, and compiled in a database 114 in the form of maps, global positioning system coordinates, audible alerts, images, comments, and anecdotes. In one embodiment, database 114 is a geographical database that stores information about pathway 108 and a geographic area that is proximal to the pathway 108. Database 114 may be operatively connected to a communication device 112 of the user 102 or members 104a, 104b of the network 120. Database 114 is also operatively connected to a global positioning system 116 that tracks movement of the user 102, members 104a, 104b, pathway 108, and obstruction 110a-c. The information stored in database 114 is perpetually evolving as the pathway 108 and obstruction 110a-c change, and as the user 102 and members 104a, 104b add information to the database 114.

In operation, when user 102 or members 104a, 104b are proximal to obstruction 110a-c, the database 114 is configured to transmit an automated alert to user 102 or members 104a, 104b, so as to indicate the presence of the obstruction 110a-c. Once alerted, user 102 may search in the database 114 or inquire from the members 104a, 104b of the network 120 about alternate pathways or additional information about obstruction 110a-c. Further, a proprietor 106 of the pathway 108 may be informed about obstruction 110a-c, so as to encourage removal of the obstruction 110a-c or to facilitate cost estimates for removal of the obstruction 110a, 110b, 110c or litigation purposes.

In some embodiments, pathway 108 may include a sidewalk, pathway, lot, parking lot, trail, subway, grass, land, property, paved road, a dirt road, a path, a park pathway 108, a bike trail, a hiking trail, a route, a tributary, a channel, and an air route. In other embodiments, obstruction 110a-c may include a physical blockage of the pathway, a hole in the pathway, uneven terrain on the pathway, a natural disaster proximal to the pathway, a wild animal proximal to the pathway, a prison escape proximal to the pathway, a traffic incident, smoke, toxic vapors, hazard, hazardous condition(s) and any general menace or danger to travelers on a pathway. Additional obstructions are more dynamic than the above listed, and may include fallen trees or branches, stones falling onto the roadway, and cargo or debris of any kind.

In other embodiments, user 102 and the members 104a, 104b may include people traveling on the pathway 108 by foot, vehicle, animal, boat, or air. In other embodiments, network 120 may include a social network, a network of commuters, a vacationer network, a traveler network, a law enforcement network, and a first response network. In other embodiments, proprietor 106 may include a land owner, a government entity, insurance company, tenant, proprietor, society, home/condominium association and any member of the network.

In one embodiment, the system 100 enables a user 102 or members 104a, 104b of network 120 to observe an obstruction 110a-c in a pathway 108 and then share the information, i.e., images, location, type, duration of the obstruction 110a-c with other members 104a, 104b of the network 120. This obstruction related information may also be shared with the database 114, which is dedicated to storing information about the obstruction 110a-c and the pathway 108. Further, a proprietor 106 of the pathway 108 may also receive the information about obstruction 110a-c.

In one embodiment, obstruction 110a-c is recorded by user 102 or members 104a, 104b of the network who have witnessed or received credible information about the obstruction 110a-c. User 102 or members 104a, 104b may then share the information to other members 104a, 104b and for storage in the database 114. The obstruction related information may include, without limitation, maps, global positioning system coordinates, audible alerts, images, comments, and anecdotes.

For example, FIG. 1 illustrates user 102 and members 104a, 104b observing various obstructions 110a, 110b, 110c, including: a depression 110a in the pathway 108, a boulder 110b in the pathway 108, and a biohazard 110c in the pathway 108. User 102 and members 104a, 104b may then share this information with the database for access by additional members or the proprietor. Once the boulder 110b has been removed, the information in the database 114 may be updated to indicate only the depression 110a and the biohazard 110c remaining. Members 104a, 104b of the network may then comment on social media how the boulder was removed, and why the depression 110a and biohazard 110c remain in pathway 108.

As a result of the shared information, user 102 and members 104a, 104b are alerted to the obstruction 110a-c and can affirm or deny that it is present at that time. This verification by members 104a, 104b may be performed through various network based means known in the art. Any party 102, 104a, 104b may verify status of obstruction 110a-c in real time.

In one embodiment, a global positioning system 116 detects the location of user 102 relative to the obstruction 110a-c, so as to alert user 102 when proximal to the obstruction 110a-c. The location of user 102 may be possible because global positioning system 116 operatively connects user's communication device 112. This creates a viable communication between user 102, members 104a, 104b, and database 114 for sharing updated information and alerting about obstructions 110a-c in real time. Through this interconnection, user 102 and members 104a, 104b may verify and add information about obstruction 110a-c, and then share this updated information with other members 104a, 104b of the network.

The transmitted alert may include, without limitation, an audible signal, vibration, message, a text, an email, and a phone call. Once alerted, the user 102 and members 104a, 104b may observe, record, comment, and notify each other about the state of obstruction 110a-c and pathway 108 in real time. User 102 and members 104a, 104b may also transmit the obstruction related information to database 114 for updating data therein.

This interactive functionality by user 102 and members 104a, 104b of the network adds further obstruction related information to the database 114, and also serves to verify the veracity of claims of the obstruction 110a-c. Once user 102 and members 104a, 104b are alerted to the obstruction 110a-c, the user 102 and members 104a, 104b can avoid the pathway 108, or the obstruction 110a-c, or both, and continue safely around obstruction 110a-c or follow an alternate pathway.

In any case, network 120 is made aware of obstruction 110a-c, whether traversing the pathway 108 or not. This is possible because user 102 and members 104a, 104b can communicate the information through a social network, a chat, a video, or other network based communication means known in the art.

Furthermore, user 102 and members 104a, 104b of the network may notify a proprietor 106 about the obstruction 110a-c, including the images, location, type, duration, and nature of the obstruction 110a-c. Proprietor 106 may include, without limitation, a landowner, a government entity, tenant, proprietor, society, home/condominium association, insurance company and other users in the network. Generally, proprietor 106 has an interest in pathway 108, and thus an interest in providing an unobstructed pathway.

System 100 further insures that user 102 and members 104a, 104b of the network are made aware that proprietor 106 has been informed about the presence of the obstruction 110a-c by generating a receipt 118 that is viewable and accessible by all parties 102, 104a, 104b, 106. The receipt 118 validates that the proprietor 106 has been notified about the obstruction 110a-c. The receipt may be useful for litigation or labor cost estimates. In this manner, the proprietor 106 is encouraged to remove or repair the obstruction 110a-c from the pathway 108.

Looking now at the flowchart of FIG. 2, a method 200 for sharing information about obstructions in a pathway 108 comprises an initial Step 202 of observing, by a user 102 or members 104a, 104b of a network 120, an obstruction 110a-c in a pathway 108. User 102 and the members 104a, 104b may include people traveling on the pathway by foot, vehicle, animal, boat, or air.

A Step 204 may further include recording, by the user 102 or members 104a, 104b of the network, information about the obstruction 110a-c, the recorded information including the location, type, and duration of the obstruction 110a-c. Method 200 enables user 102 and members 104a, 104b of a network to observe an obstruction 110a-c in a pathway 108 and then share the information, i.e., images, location, type, duration of the obstruction 110a-c with other members 104a, 104b of the network. This obstruction related information may also be shared with the database 114, which is dedicated to storing information about the obstruction 110a-c and the pathway 108.

A Step 206 further comprises verification of the obstruction 110a-c by the user 102 and the members 104a, 104b of the network. Any party 102, 104a, 104b may verify status of obstruction in real time. Another Step 208 comprises sharing the recorded information about the obstruction 110a-c with a database 114, the user 102, and the members 104a, 104b of the network. The entire network 120 is made aware of obstruction 110a-c, whether traversing the pathway 108 or not. This is possible because user 102 and members 104a, 104b can communicate the information through a social network, a chat, a video, or other network based communication means known in the art.

A Step 210 may include detecting the position of the user 102 or members 104a, 104b of the network, relative to the pathway 108. In one embodiment, a global positioning system 116 detects the location of user 102 relative to the obstruction 110a-c, so as to alert user 102 when proximal to the obstruction 110a-c. The location of user 102 may be possible because global positioning system 116 operatively connects user's communication device 112.

A Step 212 further comprises alerting the user 102 or the members 104a, 104b of the network when the user 102 or the members 104a, 104b of the network are proximal to the obstruction 110a-c. Another Step 214 comprises sharing the recorded information about the obstruction 110a-c with a proprietor 106 of the pathway 108. Generally, proprietor 106 has an interest in pathway 108, and thus an interest in providing an unobstructed pathway. The method 200 may include a further Step 216 of generating a receipt 118 indicating that the proprietor 106 is informed about the obstruction 110a-c. Method 200 may further include, an alternative Step of paying a fee to access the network and the database 114 which can be searched by users, insurance companies, litigants and other interested parties In conclusion, system 100 and method 200 for sharing information about obstructions in a pathway informs a user 102 and members 104a, 104b of a network about an obstruction 110a-c in a pathway 108. User 102 or members 104a, 104b of the network observe and record the obstruction 110a-c, and share the information in a database 114. The information can be in the form of maps, global positioning system coordinates, audible alerts, images, comments, and anecdotes.

In some embodiments, the system 100 may utilize both a geographical database 114 and a global positioning system 116 that operatively connect to a portable communication device 112 of user 102 to alert and notify about the obstruction 110a-c and also, provide additional information about pathway 108. This creates a viable communication between user 102, members 104a, 104b, and database 114 for sharing updated information and alerting about obstructions 110a-c in real time.

Through this interconnection, user 102 and members 104a, 104b may verify and add information about obstruction 110a-c, and then share this updated information with other members 104a, 104b of the network. Further, a proprietor 106 of pathway 108 may also be notified about obstruction 110a-c, so as to remove or repair obstruction 110a-c, or process cost estimates and for litigation purposes. Proprietor 106 may also have access to database 114 and communicate through network 120.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A method comprising:
    observing, by at least one member of a network, an obstruction in a pathway, wherein a user is a a member of the network;
    recording, by at least one member of the network, information about the obstruction, the recorded information including the location, type, and duration of the obstruction;
    verifying the obstruction by members of the network;
    sharing the recorded information about the obstruction with a database and members of the network;
    detecting the position of the members of the network, relative to the pathway with a global positioning system;
    notifying a proprietor of the pathway of the obstruction, wherein the proprietor is at least one of a landowner, a government entity, and other users in the network;
    sharing the recorded information about the obstruction with a proprietor of the pathway; and
    generating a receipt indicating that the proprietor is informed about the obstruction
    providing a receipt to the proprietor for validating that the proprietor has been notified of the obstruction;
    storing the receipt in a manner that is that is viewable and accessible by all parties for retrieval at a later time.

2. The method of claim 1, further comprising a step of paying a fee to at least one of search the network and the database.

3. The method of claim 1, wherein the pathway includes at least one member selected from the group consisting of: a road, a path, a park pathway, a bike trail, a hiking trail, a route, a tributary, and a channel.

4. The method of claim 1, wherein the obstruction includes at least one member selected from the group consisting of: a physical blockage of the pathway, a hole in the pathway, uneven terrain on the pathway, a natural disaster proximal to the pathway, a wild animal proximal to the pathway, a prison escape proximal to the pathway, a traffic incident, smoke, toxic vapors, hazard, hazardous condition(s) and any general menace or danger to travelers on a pathway.

5. The method of claim 1, wherein the database is a geographical database configured to store information about the pathway and proximal region of the pathway.

6. The method of claim 1, wherein the step of notifying the user or the members of the network when the user or the members of the network are proximal to the obstruction, further comprises notifying with an audible signal, vibration, message, a text, an email, and a phone call.

7. The method of claim 1, wherein the network includes at least one member selected from the group consisting of: a social network, a website, society, home or condominium association, insurance company, litigants, a network of commuters, a vacationer network, a traveler network, a law enforcement network, and a first response network.

8. The method of claim 1, wherein the proprietor includes at least one member selected from the group consisting of: a land owner, a government entity, and any member of the network.

9. The method of claim 1, wherein the method is configured to be cloud based and accessible through the Internet.

10. The method of claim 1, wherein the method is configured to be operable on a desktop operating system, website and a mobile operating system.

11. The method of claim 1, wherein the method is operable with a mobile communication device.

12. The method of claim 1, wherein the database is operatively connected to the mobile communication device.

13. A method comprising:
- observing, first, by at least one member of a network, an obstruction in a pathway, wherein a user is a member of the network;
- recording, second, by at least one member of the network, information about the obstruction, the recorded information including the location, type, and duration of the obstruction;
- verifying, third, the obstruction by members of the network other than the user;
- followed by sharing the recorded information about the obstruction with a database and members of the network;
- detecting the position of the members of the network, relative to the pathway with a global positioning system;
- notifying a proprietor of the pathway of the obstruction;
- sharing the recorded information about the obstruction with a proprietor of the pathway; and
- generating a receipt indicating that the proprietor is informed about the obstruction
- providing a receipt to the proprietor for validating that the proprietor has been notified of the obstruction;
- storing the receipt in a manner that is that is viewable and accessible by all parties for retrieval at a later time;
- paying a fee to search the network, or the database, or both; and
- providing a searchable database that can be used by litigants, users, owners, tenants, proprietors, insurance companies for providing the receipt or a certification that notice has been provided to the proprietor.

14. The method of claim 13, wherein the method is operable with a mobile communication device.

15. The method of claim 14, wherein the database is operatively connected to the mobile communication device.

16. A non-transitory program storage device readable by a machine tangibly embodying a program of instructions executable by the machine to perform a method, the storage device comprising:
- computer code for causing a machine to accept information relating to an observation, by at least one member of a network, an obstruction in a pathway wherein a user is a member of the network;
- computer code for causing the machine to record information input into the machine by the at least one member of a network about the obstruction, the recorded information including the location, type, and duration of the obstruction;
- computer code for causing the machine to verify with the at least one member of the network information about the obstruction;
- computer code for causing the machine to share the recorded information about the obstruction with a database and the members of the network;
- computer code for causing the machine to detect the position of the user or members of the network, relative to the pathway using a global positioning system;
- computer code for causing the machine to share the recorded information about the obstruction with a proprietor of the pathway;
- computer code for causing the machine to generate a receipt indicating that the proprietor is informed about the obstruction; and
- computer code for allowing a member of the network to pay a fee to search the network, or the database, or both.

* * * * *